US012698235B2

(12) United States Patent
Aykan et al.

(10) Patent No.: US 12,698,235 B2

(45) Date of Patent: Aug. 4, 2026

(54) USE OF A NAPHTHALENESULFONIC ACID POLYCONDENSATE AS A PLASTICIZER IN A CONSTRUCTION COMPOSITION AND CONSTRUCTION COMPOSITION

(71) Applicant: CONSTRUCTION RESEARCH & TECHNOLOGY GMBH, Trostberg (DE)

(72) Inventors: Gulnihal Aykan, Dubai (AE); Michael Schmidt, Dubai (AE); Sridhara Gowda, Dubai (AE); Massimo Bandiera, Trostberg (DE)

(73) Assignee: CONSTRUCTION RESEARCH & TECHNOLOGY GMBH, Trostberg (DE)

( * ) Notice: Subject to any disclaimer, the term of this patent is extended or adjusted under 35 U.S.C. 154(b) by 437 days.

(21) Appl. No.: 18/566,085

(22) PCT Filed: Jun. 21, 2022

(86) PCT No.: PCT/EP2022/066816

§ 371 (c)(1),
(2) Date: Dec. 1, 2023

(87) PCT Pub. No.: WO2022/268769

PCT Pub. Date: Dec. 29, 2022

(65) Prior Publication Data

US 2024/0254046 A1 Aug. 1, 2024

(30) Foreign Application Priority Data

Jun. 22, 2021 (EP) .................................... 21180790

(51) Int. Cl.

| | |
|---|---|
| ***C04B 18/02*** | (2006.01) |
| ***C04B 24/22*** | (2006.01) |
| ***C04B 28/04*** | (2006.01) |
| ***C04B 28/06*** | (2006.01) |
| *C04B 103/30* | (2006.01) |

(52) U.S. Cl.

CPC .......... *C04B 24/226* (2013.01); *C04B 18/021* (2013.01); *C04B 28/04* (2013.01); *C04B 28/065* (2013.01); *C04B 28/06* (2013.01); *C04B 2103/302* (2013.01); *Y02W 30/91* (2015.05)

(58) Field of Classification Search

CPC ..... C04B 24/226; C04B 18/021; C04B 28/04; C04B 28/065; C04B 28/06; C04B 2103/302; C04B 18/02; C04B 24/22; C04B 14/06; C04B 18/141; C04B 2103/10; C04B 2103/20; Y02W 30/91

See application file for complete search history.

(56) References Cited

U.S. PATENT DOCUMENTS

2009/0241696 A1* 10/2009 Jacquet .................. C04B 14/06 73/863.23

2021/0163356 A1* 6/2021 Matsumoto ......... C04B 24/2647

FOREIGN PATENT DOCUMENTS

GB 2079739 A * 1/1982 ............ C04B 28/02

JP H06 340459 A 12/1994

OTHER PUBLICATIONS

International Search Report for Application No. PCT/EP2022/066816 dated Sep. 13, 2022.

Written Opinion for Application No. PCT/EP2022/066816 dated Sep. 13, 2022.

* cited by examiner

*Primary Examiner* — Marites A Guino-O Uzzle

(74) *Attorney, Agent, or Firm* — Curatolo Sidoti & Trillis Co., LPA; Floyd Trillis, III; Salvatore Sidoti

(57) ABSTRACT

A naphthalenesulfonic acid polycondensate is used as a plasticizer in a construction composition comprising sand and at least one cementitious binder. The naphthalenesulfonic acid polycondensate is obtainable by a condensation reaction of i) a naphthalenesulfonic acid, ii) an alkoxylated hydroxyaryl compound having a polyoxyalkylene chain with 3 to 130 oxyalkylene units, and iii) formaldehyde, in a weight ratio of i):ii) of 95:5 to 60:40, preferably 95:5 to 75:25, more preferably 95:5 to 85:15, wherein the sand has a methylene blue value according to DIN EN 933-9 of at least 10 g/kg. The naphthalenesulfonic acid polycondensate is largely clay-insensitive and its dispersibility is independent of the quality of the sand.

22 Claims, No Drawings

USE OF A NAPHTHALENESULFONIC ACID POLYCONDENSATE AS A PLASTICIZER IN A CONSTRUCTION COMPOSITION AND CONSTRUCTION COMPOSITION

CROSS REFERENCE TO RELATED APPLICATIONS

This application is a national stage application of International Application No. PCT/EP2022/066816, filed 21 Jun. 2022, which claims the benefit of the foiling date of European Application Serial No. 21180790.4, filed 22 Jun. 2021, both of which applications are incorporated herein by reference.

The present invention relates to the use of a certain naphthalenesulfonic acid polycondensate as a plasticizer in a construction composition comprising sand and at least one cementitious binder. The invention further relates to a construction composition comprising a cementitious binder, sand and said naphthalenesulfonic acid polycondensate.

It is known that dispersants are added to aqueous slurries of hydraulic binders for improving their workability, i.e. spreadability, pumpability or flowability. Such admixtures are capable of preventing the formation of solid agglomerates and of dispersing the particles already present and those newly formed by hydration and in this way improving the workability. In order to convert the pulverulent binders into a freshly mixed processible form, substantially more mixing water is required than would be necessary for the subsequent hydration and hardening process. The voids formed in the concrete body by the excess of water, which subsequently evaporates, lead to poor mechanical strength and resistance. In order to reduce the excess proportion of water at a predetermined processing consistency and/or to improve the workability at a predetermined water/binder ratio, admixtures are used which are generally referred to as water-reducing agents or plasticizers. Those which allow high levels of water reduction are known as high range water reducers or superplasticizers. Polycarboxylate ether type superplasticizers are commonly used.

Generally, sands which may be used as fillers in cementitious compositions may contain clay minerals. Clays are hydrous aluminum phyllosilicates comprised of tetrahedral and octahedral sheets. The exact natures of the layers and the cations between the layers determine the behavior of the clay: Expansive clays contain exchangeable cations between the layers that can be hydrated, resulting in increased spacing between layers which is also referred to as swelling. In contrast, the layers in non-expansive clay, e.g. illite, mica, and kaolin, are held closely together.

Clays exhibit surface charges and have very fine particle size of typically less than 2 μm. Both expansive and non-expansive clays negatively impact concrete behavior by increasing the amount of water needed for achieving a desired concrete rheology. The effect of non-expansive clays is due mostly to the small particle size, surface charge, and poor particle shape. For instance, mica has a flat, flakey particle shape and can break down upon shear, e.g. during concrete mixing, resulting in very poor concrete workability. It is believed that expansive clays have a greater influence on concrete rheology than non-expansive clays because they can expand and consume free water from the concrete mixture.

In addition, expansive clays have been observed to impede the performance of polycarboxylate ether type superplasticizers which are intended to adsorb onto cement particles in order to disperse them within an aqueous slurry or paste. Expansive clays interfere with this function. In this case, the adsorbed superplasticizers can no longer act as plasticizers resulting in a construction composition of reduced flowability. This disadvantageously results in fluctuation of concrete quality which is only recognizable after mixing is finished. In order to combat the problems regarding workability, one may increase the amount of water used in concrete. However, these measures may create additional problems. An increase in water content to improve workability tends to reduce strength and durability of the concrete. Alternatively, the disadvantage of reduced workability may be overcome by e.g. addition of larger amounts of superplasticizers for attaining a given level of workability in concrete.

Sand of good quality, i.e., sand having a low or zero clay content, is not available in in unlimited quantities and the cost of higher-grade sand is rising. Because of a restricted transport range, there is generally a need to rely on local generally sources of sand. Therefore, there is an ever-increasing need to also utilize sand of poor quality.

Industrially, the problem of adsorption of superplasticizers to clay is commonly solved by at least partly removing clay from the sand to be used in concrete by washing said sand. However, this requires washing of excessive amounts of sands resulting in added costs and disposal. Further, in the event that washing is inadequate, some clay may be invariably left in the sand and may still affect the behavior of polycarboxylate ether type dispersants negatively.

JPH06340459A describes a cement dispersant capable of eliminating transportation trouble by pumping because there is no slump loss over a long time. The cement dispersant is obtainable by a co-condensation procedure of formaldehyde, one or more aromatic compounds obtained by introducing 1 to 100 mol of oxyalkylene groups having 2 to 3 carbon atoms, and one or more materials co-condensable with formaldehyde. The co-condensation product comprises a sulfonate group or sulfomethyl group.

EP 0 780 348 A1 describes a cement dispersant comprising a polymer which is obtained by co-condensating monomers comprising monomer (A) and monomer (B) with formaldehyde, or a salt obtained by neutralizing the polymer. Monomer (A) is an aromatic compound having, on the average, 1 to 300 mol per molecule of at least one member selected from the group consisting of oxyethylene group and oxypropylene group, and monomer (B) is an aromatic compound having a carboxyl group. EP 0 780 348 A1 discloses a working example wherein the cement dispersant is used in a concrete comprising river sand.

In addition, it is not unusual that individual batches of sand have varying clay-contents. As it is neither possible in terms of time nor economically reasonable to constantly examine the sand regarding its quality, it is therefore an object of the present invention to provide a plasticizer for use in a construction composition which is largely independent of the quality of the sand used in the construction composition.

Accordingly, the invention relates to the use of a naphthalenesulfonic acid polycondensate as a plasticizer in a construction composition comprising sand and at least one cementitious binder, the naphthalenesulfonic acid polycondensate being obtainable by a condensation reaction of i) a naphthalenesulfonic acid,
ii) an alkoxylated hydroxyaryl compound having a polyoxyalkylene chain with 3 to 130 oxyalkylene units, and
iii) formaldehyde, in a weight ratio of i):ii) of 95:5 to 60:40, preferably 95:5 to 75:25, more preferably 95:5 to 85:15, wherein the sand has a methylene blue value according to DIN EN 933-9 of at least 10 g/kg.

According to the invention, the construction composition contains sand, but extends to embodiments wherein the construction composition contains, in addition to sand, coarse aggregates.

According to the invention, the naphthalenesulfonic acid polycondensate is used as a plasticizer in a construction composition comprising sand and at least one cementitious binder, wherein the sand has a methylene blue value according to DIN EN 933-9 of at least 10 g/kg.

Herein, the term "sand", also termed "fine aggregates", denotes aggregates, wherein most of the particles (e.g., at least 95% of the particles) have a particle size of 0 to mm. In other words, "sand" denotes aggregates which pass a sieve having a nominal opening size of 5 mm. The term "coarse aggregates" denotes aggregates, wherein most of the particles (e.g., at least 95% of the particles) have a particle size of more than 5 to 40 mm, e.g. more than 5 to 30 mm or 10 to 20 mm.

Generally, such aggregates may either be natural aggregates or crushed aggregates.

Usually, natural aggregates are dug or dredged from a pit, river, lake, seabed, or desert.

Usually, crushed aggregates are produced by crushing quarry rock, boulders, cobbles, or large-size gravel. Crushed air-cooled blast-furnace slag and recycled concrete both are also used as aggregates.

Generally, sand consists of natural sand or crushed stone having the particle size as described above; and coarse aggregates consist of one or more gravels or crushed stone having the particle size as described above.

The aggregates are usually graded at the pit or plant and optionally washed. Some variation in type, quality, cleanliness, grading, moisture content, and other properties is expected. For example, whereas river sand usually contains negligible amounts of clay, this is not always true for pit sand.

The composition of aggregates including sand varies, depending on the local sources and conditions. Naturally occurring aggregates are minerals, rocks, or mixtures thereof. A mineral is a naturally occurring solid substance with an orderly internal structure and a chemical composition that ranges within narrow limits. Rocks, which are classified as igneous, sedimentary, or metamorphic, depending on origin, are generally composed of several minerals. Weathering and erosion of rocks produce particles of stone, gravel, sand, silt, and clay.

Igneous rocks include granite, syenite, diorite, gabbro, peridotite, pegmatite, volcanic glass, felsite, and basalt.

Metamorphic rocks include marble, metaquartzite, slate, phyllite, schist, amphibolite, hornfels, gneiss, and serpentinite.

Sedimentary rocks include conglomerate, sandstone, claystone, siltstone, argillite, shale, and chert.

The most common constituent of sand in continental settings and non-tropical coastal settings is silica, usually in the form of quartz. Hence, the sand is preferably a silica-based sand, such as quartz sand.

In an embodiment, the sand has a methylene blue value according to DIN EN 933-9 of 10 to 50 g/kg, preferably 15 to 35 g/kg, more preferably 20 to 30 g/kg.

The "methylene blue test" according to DIN EN 933-9 is a common procedure to investigate sand for its clay-content. It uses titration to determine the amount of methylene blue adsorbed by clay. Methylene blue is a cationic organic dye consisting of a positive portion, i.e. a colored part, and an off-setting negative portion, i.e. an anion. When such a cationic organic dye is dissolved in water, it typically dissociates into anions and cations, and the cationic portion colors the solution. Indeed, methylene blue has a very strong affinity for clays. Thus, in the event that the investigated sand contains clay, the methylene blue added adsorbs on the surface of the clay.

A methylene blue test according to DIN EN 933-9 is carried out by mixing a known quantity of methylene blue with a known quantity of sand in order to search for the maximum amount of methylene blue susceptible to adsorb onto clay. The methylene blue test is performed on the 0 to 2 mm fraction of a sand. Generally, carrying out this test is simple: Given volumes of a solution of methylene blue are gradually added to a solution containing a known quantity of sand. After each addition, the adsorption of methylene blue is checked by dotting spots with the resulting suspension on a filter paper for detecting the presence of free methylene blue. The presence of free methylene blue is confirmed in the event that a halo consisting of a persistent light blue ring of about 1 mm is formed around the central deposit. From the mass of the test portion and the total volume of methylene blue solution injected, the methylene blue value may be calculated. It is reported as g of methylene blue per kg of the 0 to 2 mm fraction of the sand.

The term "clay" refers to aluminum and/or magnesium silicates, including phyllosilicates having a lamellar structure, as well as other types of clays such as amorphous clays. The clays include 2:1 type such as smectite type clays and 1:1 type clays such as kaolinite and 2:1:1 type such as chlorite. The clay can be bentonite and/or an aluminum phyllosilicate clay consisting mostly of montmorillonite.

The inventors have surprisingly found that the naphthalenesulfonic acid polycondensates used according to the invention are largely clay-insensitive and solve the problem underlying the present invention.

Said naphthalenesulfonic acid polycondensates are based on the structure of β-naphthalene sulfonate-formaldehyde (BNS) condensate. The BNS is a readily-available material, widely used as a superplasticizer in concrete industry. The condensates used according to the invention incorporate polyoxyalkylene side chains. They provide benefits over the state of the art in terms of use in compositions containing problematic aggregates such as clay-containing sands or aggregates having high methylene-blue values which may adsorb superplasticizers and thus decreasing the dispersion capability. Advantageously, the naphthalenesulfonic acid polycondensates may be used in similar amounts compared to regular BNS, wherein the influence fluctuations of quality of sand is reduced while comparable compressive strengths of the construction compositions are achieved.

The naphthalenesulfonic acid polycondensate used in accordance with the invention is obtainable by a condensation reaction of i) a naphthalenesulfonic acid,
ii) an alkoxylated hydroxyaryl compound having a polyoxyalkylene chain with 3 to 130 oxyalkylene units, and
iii) formaldehyde.

The naphthalenesulfonic acid compound i) may be selected from naphthalene-1-sulfonic acid, naphthalene-2-sulfonic acid, and a mixture thereof. Naphthalene-2-sulfonic acid is preferred. The naphthalenesulfonic acid compound i) is an important intermediate in the manufacture of dyes and other chemicals. It is commercially available and is manufactured on an industrial scale by a sulfonation reaction of naphthalene with a suitable sulfonating agent such as sulfuric acid. The product of the sulfonation reaction may contain minor amounts of unreacted naphthalene which typically do not interfere with subsequent reactions and which therefore are not removed.

The alkoxylated hydroxyaryl compound ii) is a hydroxyaryl compound having a polyoxyalkylene chain with 3 to 130, preferably 5 to 100, more preferably 8 to 80 oxyalkylene units.

Herein, the term "alkoxylated hydroxyaryl compound" denotes a compound having an aromatic core and at least one hydroxyl group directly attached to the aromatic core. The alkoxylated hydroxyaryl compound may have one or more further substituents as long as the presence of such substituents does not interfere with the condensation reaction of the alkoxylated hydroxyaryl compound ii) and formaldehyde iii). In an embodiment, the hydroxyaryl compound is selected from unsubstituted or monosubstituted phenols, and unsubstituted or monosubstituted naphthols. Suitably, the phenols and naphthols may be monosubstituted with a substituent selected from alkyl groups and carboxylic groups. Suitable naphthols are selected from 1-naphthol and 2-naphthol. Suitable alkyl-substituted phenols are selected from ortho-cresol, meta-cresol and para-cresol. Suitable carboxylic-substituted phenols are selected from gallic acid and salicylic acid.

Herein, the term "oxyalkylene units" refers to a repeating unit of general formula (A-1):

$$—[—R—O—]— \qquad (A\text{-}1)$$

wherein R denotes a linear or branched alkylene unit having at least 2 carbon atoms, preferably 2 to 4 carbon atoms. The polyoxyalkylene chain may comprise identical or different oxyalkylene units. Different oxyalkylene units may be arranged either in a random or a block-wise fashion. Preferably, the oxyalkylene unit is an oxyethylene group ($—CH_2—CH_2—O—$) and/or an oxypropylene group ($—CH(CH_3)—CH_2—O—$ and/or $—CH_2—CH(CH_3)—O—$), preferably an oxyethylene group.

The alkoxylated hydroxyaryl compounds ii) may be obtained by reaction of hydroxyaryl compounds with alkylene oxides such as ethylene oxide or propylene oxide. The alkylene oxides introduce one or more divalent oxyalkylene groups into the hydroxyaryl compounds, e.g. into the phenol molecule. Such alkylene oxide residue is then interposed between the hydroxyl group oxygen atom and its hydrogen atom.

Generally, such an alkoxylated compound may be a single compound. However, usually, it is a mixture of compounds in which the numbers of oxyalkylene groups in the compounds are present as a distribution. That is that the number of 3 to 130 oxyalkylene units per polyoxyalkylene chain represents an average value of oxyalkylene units per polyoxyalkylene chain.

In an embodiment, the polyoxyalkylene units comprise at least 60 mol-%, preferably at least 85 mol-%, more preferably at least 95 mol-% of oxyethylene units.

In an embodiment, the alkoxylated hydroxyaryl compound ii) is an ethoxylated phenol. The term "ethoxylated phenol" denotes a hydroxyaryl compound that has been reacted with ethylene oxide to yield a polyoxyalkylene chain consisting of 100% oxyethylene units.

Suitably, such ethoxylated phenol is prepared by an ethoxylation reaction of phenol, or phenoxyethanol using ethylene oxide. Generally, such a phenoxyethanol precursor may be produced by a hydroxyethylation reaction of phenol using ethylene oxide, e.g. by a Williamson ether synthesis. Said phenoxyethanol precursor carries a hydroxyethyl moiety at the phenolic hydroxyl group oxygen atom at which a (poly)-oxyethylene chain may subsequently be attached.

The naphthalenesulfonic acid i) and the alkoxylated hydroxyaryl compound ii) are reacted in a weight ratio of i):ii) of 95:5 to 60:40, preferably 95:5 to 75:25, more preferably 95:5 to 85:15.

Suitably, the naphthalenesulfonic acid polycondensate has a weight-average molecular weight of 2000 to 60000 g/mol, preferably 3000 to 40000 g/mol, more preferably 3000 to 12000 g/mol. The molecular weight of the naphthalenesulfonic acid polycondensate is suitably determined by gel permeation chromatography (GPC) on a stationary phase containing sulfonated styrene-divinylbenzene with an eluent of 80 vol.-% of an aqueous solution of $Na_2HPO_4$ (0.07 mol/L) and 20 vol.-% of acetonitrile after calibration with polystyrene sulfonate standards.

For the preparation of the naphthalenesulfonic acid polycondensate, the above-described naphthalenesulfonic acid i) and the alkoxylated hydroxyaryl compound ii) are reacted with formaldehyde iii). The naphthalenesulfonic acid i-1) may be prepared in situ by reacting naphthalene and sulfuric acid, and reacted with the alkoxylated hydroxyaryl compound i-2) and formaldehyde i-3). Suitably, the formaldehyde iii) is added in form of paraformaldehyde or an aqueous formaldehyde solution, e.g. having a formaldehyde content of 25% to 37%. Formaldehyde iii) is present in at least a stoichiometric amount, that is, formaldehyde iii) is used in a molar amount equal to the sum of the molar amounts of the naphthalenesulfonic acid i) and the alkoxylated hydroxyaryl compound ii). Formaldehyde iii) may be used in excess of the stoichiometric amount.

The condensation reaction of the naphthalenesulfonic acid i), the alkoxylated hydroxyaryl compound ii) and formaldehyde iii) can be carried out according to processes known per se.

For carrying out the condensation process, the naphthalenesulfonic acid i) and the alkoxylated hydroxyaryl compound ii), in predetermined amounts, are mixed with in water, preferably in a sealed pressure reactor such as an autoclave. As described above, alternatively, naphthalene and sulfuric acid are mixed together with the alkoxylated hydroxyaryl compound ii), in predetermined amounts, and water. Suitably, the amount of water is adjusted in a way that the viscosity of the reaction mixture may be controlled such that the reaction mixture remains stirrable during the whole condensation process. When naphthalenesulfonic acid i) is prepared in situ, naphthalene is reacted with sulfuric acid, the mixture is cooled, and diluted with water. Then, the alkoxylated hydroxyaryl compound ii) is added as described above. Generally, the condensation process is carried out under acidic conditions. In the event that the existing acidity of the naphthalenesulfonic acid, or, in the event that the naphthalenesulfonic acid i-1) is prepared in situ, from the sulfuric acid, is not sufficient for carrying out the condensation process, an additional acid, e.g. sulfuric acid or the like, may be added to the reaction mixture in an amount such that the pH of the reaction mixture is in a range for successfully carrying out the condensation process. For adding a predetermined amount of formaldehyde iii) to the resulting mixture, the formaldehyde source and, optionally, water, are dropwise added to the mixture of i) and ii) in water at a temperature of 100 to 110° C. over a timespan of 2.5 to 3.5 hours while stirring. After completion of the dropwise addition, the mixture is heated to a temperature of 110 to 120° C. for 3 to 5 hours while stirring. The polycondensation reaction is preferably carried out in a sealed pressure reactor such as an autoclave. Then, the reaction mixture is cooled to about 80° C., and excess amounts of a base, e.g. sodium hydroxide, are added. In the event that no solid precipitate is detected in the resulting reaction mixture, no further work-up is necessary. Otherwise, the reaction mixture is suitably filtered in order to remove the solid precipitates.

The resulting naphthalenesulfonic acid polycondensate obtained from the condensation process may be used as a plasticizer in a construction composition as it is. However, from the viewpoint of the storage and use thereof, the neutralized salt of the above naphthalenesulfonic acid polycondensate may be preferred. Examples of the neutralized salt of the above polymer include monovalent metal salts such as alkaline metal salts, divalent metal salts such as alkaline earth metal salts, ammonium salt, amine salts and substituted amine salts such as alkylamine salts having 1 to 3 carbon atoms, monoethanolamine salt, diethanolamine salt and triethanolamine salt of the naphthalenesulfonic acid polycondensate. As the neutralizing agent, it is possible to employ calcium hydroxide, sodium hydroxide, calcium carbonate, and calcium oxide.

The aqueous solution can be used as it is or as a cement dispersant composition to which other ingredients are suitably added. The solids content of the aqueous solution varies depending on use, and for use as a cement dispersant, the solids content is preferably 30 to 45 wt.-%. If necessary, the aqueous solution may be dried and powdered to give a powdered water-soluble salt of a naphthalenesulfonic acid polycondensate which may then be used as powdered cement dispersant. Drying and powdering can be carried out by spray drying, drum drying, freeze drying, etc.

The construction composition of the invention can be provided as dry-mix to which water is added immediately prior to its use. The naphthalenesulfonic acid polycondensate may be included in the dry-mix in a dry, powdered form.

Alternatively, the naphthalenesulfonic acid polycondensate is incorporated in the construction composition together with the mixing water or after addition of the mixing water. In this case, it is referred to as construction composition "in freshly mixed form" in the context of the present patent application. In other words, the construction composition in freshly mixed may, for example, be concrete, mortar or grout. In an embodiment, the construction composition, in freshly mixed form, has a ratio of water to cementitious binder in the range of 0.3 to 0.6, preferably 0.35 to 0.4.

The construction composition comprises a cementitious binder.

In an embodiment, the cementitious binder comprises a cement selected from Portland cement, calcium aluminate cement and sulfoaluminate cement.

In an embodiment, the cementitious binder additionally comprises a supplementary cementitious material, such as latent hydraulic binders or pozzolanic binders.

In general terms, the above-mentioned latent hydraulic binders can be selected from industrial and/or synthetic slag, in particular from blast furnace slag, electrothermal phosphorous slag, steel slag and mixtures thereof. The "pozzolanic binders" can generally be selected from amorphous silica, preferably precipitated silica, fumed silica and microsilica, ground glass, metakaolin, aluminosilicates, fly ash, preferably brown-coal fly ash and hard-coal fly ash, natural pozzolans such as tuff, trass and volcanic ash, calcined clays, burnt shale, rice husk ash, natural and synthetic zeolites and mixtures thereof.

The slag can be either industrial slag, i.e. waste products from industrial processes, or else synthetic slag. The latter can be advantageous because industrial slag is not always available in consistent quantity and quality.

Blast furnace slag (BFS) is a waste product of the glass furnace process. Other materials are granulated blast furnace slag (GBFS) and ground granulated blast furnace slag (GGBFS), which is granulated blast furnace slag that has been finely pulverized. Ground granulated blast furnace slag varies in terms of grinding fineness and grain size distribution, which depend on origin and treatment method, and grinding fineness influences reactivity here. The Blaine value is used as parameter for grinding fineness, and typically has an order of magnitude of from 200 to 1000 $m^2$ $kg^{-1}$, preferably from 300 to 500 $m^2$ $kg^{-1}$. Finer milling gives higher reactivity.

The expression "blast furnace slag" is intended to comprise materials resulting from all of the levels of treatment, milling, and quality mentioned (i.e. BFS, GBFS and GGBFS). Blast furnace slag generally comprises from 30 to 45% by weight of CaO, about 4 to 17% by weight of MgO, about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$.

Electrothermal phosphorous slag is a waste product of electrothermal phosphorous production. It is less reactive than blast furnace slag and comprises about 45 to 50% by weight of CaO, about 0.5 to 3% by weight of MgO, about 38 to 43% by weight of $SiO_2$, about 2 to 5% by weight of $Al_2O_3$ and about 0.2 to 3% by weight of $Fe_2O_3$, and also fluoride and phosphate. Steel slag is a waste product of various steel production processes with greatly varying composition.

Amorphous silica is preferably an X ray-amorphous silica, i.e. a silica for which the powder diffraction method reveals no crystallinity. The content of $SiO_2$ in the amorphous silica of the invention is advantageously at least 80% by weight, preferably at least 90% by weight. Precipitated silica is obtained on an industrial scale by way of precipitating processes starting from water glass. Precipitated silica from some production processes is also called silica gel.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 $m^2$ $g^{-1}$.

Microsilica is a by-product of silicon production or ferrosilicon production, and likewise consists mostly of amorphous $SiO_2$ powder. The particles have diameters of the order of magnitude of 0.1 μm. Specific surface area is of the order of magnitude of from 15 to 30 $m^2$ $g^{-1}$.

Metakaolin is produced when kaolin is dehydrated. Whereas at from 100 to 200° C. kaolin releases physically bound water, at from 500 to 800° C. a dehydroxylation takes place, with collapse of the lattice structure and formation of metakaolin ($Al_2Si_2O_7$). Accordingly pure metakaolin comprises about 54% by weight of $SiO_2$ and about 46% by weight of $Al_2O_3$.

Fly ash is produced inter alia during the combustion of coal in power stations. Class C fly ash (brown-coal fly ash) comprises according to WO 08/012438 about 10% by weight of CaO, whereas class F fly ash (hard-coal fly ash) comprises less than 8% by weight, preferably less than 4% by weight, and typically about 2% by weight of CaO.

In case the construction composition contains a low amount of hydraulic binder (e.g. ≤10%), an alkaline activator can be further added to promote strength development. Alkaline activators are preferably used in the binder system, such alkaline activators are for example aqueous solutions of alkali metal fluorides, alkali metal hydroxides, alkali metal aluminates or alkali metal silicates, such as soluble waterglass, and mixtures thereof.

In an embodiment, the latent hydraulic binder is blast furnace slag.

In an embodiment, the construction composition additionally comprises at least one retarder and/or accelerator.

It is important to maintain the construction composition in a pumpable slurry state until it is placed in a desired location. For this purpose, a cement retarder, which is sometimes referred to as a set retarder or simply a retarder, can be used in the construction composition. A retarder retards the setting process and helps to provide an adequate pumping time to place the cement slurry. Compositions commonly used in cementing operations for delaying the set time of a cement composition include lignosulfates, hydroxycarboxylic acids (e.g., gluconic acid, citric acid and tartaric acid), phosphonic acid derivatives, synthetic polymers (e.g., copolymers of 2-acrylamido-2-methylpropane sulfonic acid ("AMPS")), borate salts, and combinations thereof. Other conventionally used retarders are carbohydrates including saccharides such as sucrose, glucose, fructose, high fructose corn syrup or cane molasses, lactose, raffinose, and dextrin.

Suitably, an accelerator as conventionally used may be selected from alkaline metal salts, alkaline earth metal salts, or aluminum salts, in particular lithium carbonate, potassium carbonate, lithium sulfate, lithium nitrate, sodium nitrate, calcium nitrate, lithium formiate, sodium formiate, calcium formiate, or aluminum sulfate; alkanolamines such as diethanolamine, triethanolamine and methyl diethanolamine. It is considered that addition of C—S—H (calcium silicate hydrate) nanoparticles has a seeding effect which also accelerates the hardening.

The dosage of the naphthalenesulfonic acid polycondensate used according to the invention is adjusted so as to achieve the desired rheological properties, e.g. spreadability, pumpability, flowability, of a construction composition. In order to accommodate different purposes such as to achieve still lower water to cement ratios, it may be desirable to include further dispersants. If such mixtures of the naphthalenesulfonic acid polycondensate used according to the invention with other dispersants are used, the naphthalenesulfonic acid polycondensate used according to the invention may be present in an amount of 1 to 99 wt.-%, preferably 5 to 95 wt.-%, more preferably at least about 40 wt.-%, relative to the total amount of dispersants and plasticizers.

In an embodiment, the construction composition additionally comprises at least one dispersant other than the naphthalenesulfonic acid polycondensate for inorganic binders, especially a dispersant for cementitious mixtures like concrete or mortar.

Suitably, the dispersant other than the naphthalenesulfonic acid polycondensate may be selected from

- comb polymers having a carbon-containing backbone to which are attached pendant cement-anchoring groups and polyether side chains,
- non-ionic comb polymers having a carbon-containing backbone to which are attached pendant hydrolysable groups and polyether side chains, the hydrolysable groups upon hydrolysis releasing cement-anchoring groups,
- colloidally disperse preparations of polyvalent metal cations, such as $Al^{3+}$, $Fe^{3+}$ or $Fe^{2+}$, and a polymeric dispersant which comprises anionic and/or anionogenic groups and polyether side chains, and the polyvalent metal cation is present in a superstoichiometric quantity, calculated as cation equivalents, based on the sum of the anionic and anionogenic groups of the polymeric dispersant,
- sulfonated melamine-formaldehyde condensates,
- lignosulfonates,
- sulfonated ketone-formaldehyde condensates,
- sulfonated naphthalene-formaldehyde condensates,
- phosphonate containing dispersants,
- phosphate containing dispersants, and
- mixtures thereof.

Comb polymers having a carbon-containing backbone to which are attached pendant cement-anchoring groups and polyether side chains are particularly preferred. The cement-anchoring groups are anionic and/or anionogenic groups such as carboxylic groups, phosphonic or phosphoric acid groups or their anions. Anionogenic groups are the acid groups present in the polymeric dispersant, which can be transformed to the respective anionic group under alkaline conditions.

While comb polymers may have limited efficiency in clay-containing sand, this effect is to some extent mitigated when using the naphthalenesulfonic acid polycondensates according to the invention.

Preferably, the comb polymers comprise structural units selected from at least one the general formulae (Ia), (Ib), (Ic) and/or (Id), which impart anionic and/or anionogenic groups:

(Ia)

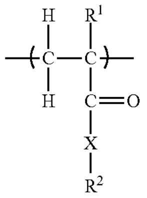

wherein $R^1$ is H, $C_1$-$C_4$ alkyl, $CH_2COOH$ or $CH_2CO$—X—$R^{3A}$, preferably H or methyl;

X is NH—$(C_{n1}H_{2n1})$ or O—$(C_{n1}H_{2n1}$ with n1=1, 2, 3 or 4, the nitrogen atom or the oxygen atom being bonded to the CO group;

$R^2$ is OM, $PO_3M_2$, or O—$PO_3M_2$; or

X is a chemical bond and $R^2$ is OM;

$R^{3A}$ is $PO_3M_2$, or O—$PO_3M_2$;

(Ib)

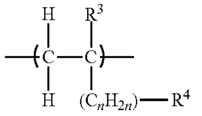

wherein $R^3$ is H or $C_1$-$C_4$ alkyl, preferably H or methyl;

n is 0, 1, 2, 3 or 4;

$R^4$ is $PO_3M_2$, or O—$PO_3M_2$;

(Ic)

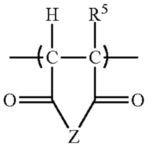

wherein $R^5$ is H or $C_1$-$C_4$ alkyl, preferably H;

Z is O or $NR^7$;

$R^7$ is H, $(C_{n1}H_{2n1})$—OH, $(C_{n1}H_{2n1})$—$PO_3M_2$, $(C_{n1}H_{2n1})$—$OPO_3M_2$, $(C_6H_4)$—$PO_3M_2$, or $(C_6H_4)$—$OPO_3M_2$, and n1 is 1, 2, 3 or 4;

(Id)

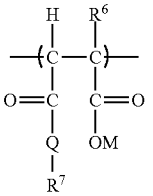

wherein $R^6$ is H or $C_1$-$C_4$ alkyl, preferably H;

Q is $NR^7$ or O;

$R^7$ is H, $(C_{n1}H_{2n1})$—OH, $(C_{n1}H_{2n1})$—$PO_3M_2$, $(C_{n1}H_{2n1})$—$OPO_3M_2$, $(C_6H_4)$—$PO_3M_2$, or $(C_6H_4)$—$OPO_3M_2$, n1 is 1, 2, 3 or 4; and where each M independently is H or a cation equivalent.

Preferably, the comb polymers comprise structural units selected from at least one the general formulae (IIa), (IIb), (IIc) and/or (IId), which impart polyether side chains:

(IIa)

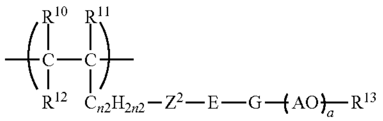

wherein $R^{10}$, $R^{11}$ and $R^{12}$ independently of one another are H or $C_1$-$C_4$ alkyl, preferably H or methyl;

$Z^2$ is O or S;

E is $C_2$-$C_6$ alkylene, cyclohexylene, $CH_2$—$C_6H_{10}$, 1,2-phenylene, 1,3-phenylene or 1,4-phenylene;

G is O, NH or CO—NH; or

E and G together are a chemical bond;

A is $C_2$-$C_5$ alkylene or $CH_2CH(C_6H_5)$, preferably $C_2$-$C_3$ alkylene;

n2 is 0, 1, 2, 3, 4 or 5;

a is an integer from 2 to 350, preferably 10 to 150, more preferably 20 to 100;

$R^{13}$ is H, an unbranched or branched $C_1$-$C_4$ alkyl group, CO—$NH_2$ or $COCH_3$;

(IIb)

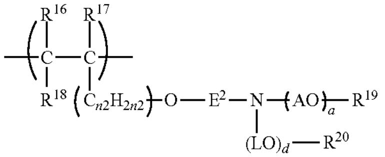

wherein $R^{16}$, $R^{17}$ and $R^{18}$ independently of one another are H or $C_1$-$C_4$ alkyl, preferably H;

$E^2$ is $C_2$-$C_6$ alkylene, cyclohexylene, $CH_2$—$C_6H_{10}$, 1,2-phenylene, 1,3-phenylene, or 1,4-phenylene, or is a chemical bond;

A is $C_2$-$C_5$ alkylene or $CH_2CH(C_6H_5)$, preferably $C_2$-$C_3$ alkylene;

n2 is 0, 1, 2, 3, 4 or 5;

L is $C_2$-$C_5$ alkylene or $CH_2CH(C_6H_5)$, preferably $C_2$-$C_3$ alkylene;

a is an integer from 2 to 350, preferably 10 to 150, more preferably 20 to 100;

d is an integer from 1 to 350, preferably 10 to 150, more preferably 20 to 100;

$R^{19}$ is H or $C_1$-$C_4$ alkyl; and $R^{20}$ is H or $C_1$-$C_4$ alkyl;

(IIc)

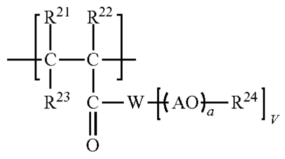

wherein $R^{21}$, $R^{22}$ and $R^{23}$ independently are H or $C_1$-$C_4$ alkyl, preferably H;

W is O, $NR^{25}$, or is N;

V is 1 if W=O or $NR^{25}$, and is 2 if W=N;

A is $C_2$-$C_5$ alkylene or $CH_2CH(C_6H_5)$, preferably $C_2$-$C_3$ alkylene;

a is an integer from 2 to 350, preferably 10 to 150, more preferably 20 to 100;

$R^{24}$ is H or $C_1$-$C_4$ alkyl;

$R^{25}$ is H or $C_1$-$C_4$ alkyl;

(IId)

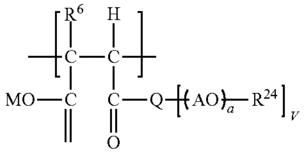

wherein $R^6$ is H or $C_1$-$C_4$ alkyl, preferably H;

Q is $NR^{10}$, N or O;

V is 1 if Q=O or $NR^{10}$ and is 2 if Q=N;

$R^{10}$ is H or $C_1$-$C_4$ alkyl;

$R^{24}$ is H or $C_1$-$C_4$ alkyl;

A is $C_2$-$C_5$ alkylene or $CH_2CH(C_6H_5)$, preferably $C_2$-$C_3$ alkylene; and a is an integer from 2 to 350, preferably 10 to 150, more preferably 20 to 100;

where each M independently is H or a cation equivalent.

The molar ratio of structural units (I) to structural units (II) varies from 1:3 to about 10:1, preferably 1:1 to 10:1, more preferably 3:1 to 6:1. The polymeric dispersants comprising structural units (I) and (II) can be prepared by conventional methods, for example by free radical polymerization or controlled radical polymerization. The preparation of the dispersants is, for example, described in EP 0 894 811, EP 1 851 256, EP 2 463 314, and EP 0 753 488.

A number of useful dispersants contain carboxyl groups, salts thereof or hydrolysable groups releasing carboxyl groups upon hydrolysis. Preferably, the milliequivalent number of carboxyl groups contained in these dispersants (or of carboxyl groups releasable upon hydrolysis of hydrolysable groups contained in the dispersant) is lower than 3.0 meq/g, assuming all the carboxyl groups to be in unneutralized form.

More preferably, the dispersant is selected from the group of polycarboxylate ethers (PCEs). In PCEs, the anionic groups are carboxylic groups and/or carboxylate groups. The PCE is preferably obtainable by radical copolymerization of a polyether macromonomer and a monomer comprising anionic and/or anionogenic groups. Preferably, at least 45 mol-%, preferably at least 80 mol-% of all structural units constituting the copolymer are structural units of the polyether macromonomer or the monomer comprising anionic and/or anionogenic groups.

A further class of suitable comb polymers having a carbon-containing backbone to which are attached pendant cement-anchoring groups and polyether side chains comprise structural units (III) and (IV):

(III)

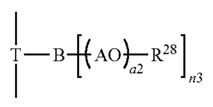

wherein

T is phenyl, naphthyl or heteroaryl having 5 to 10 ring atoms, of which 1 or 2 atoms are heteroatoms selected from N, O and S;

n3 is 1 or 2;

B is N, NH or O, with the proviso that n3 is 2 if B is N and n3 is 1 if B is NH or O;

A is $C_2$-$C_5$ alkylene or $CH_2CH(C_6H_5)$, preferably $C_2$-$C_3$ alkylene;

a2 is an integer from 1 to 300;

$R^{26}$ is H, $C_1$-$C_{10}$ alkyl, $C_5$-$C_8$ cycloalkyl, aryl, or heteroaryl having 5 to 10 ring atoms, of which 1 or 2 atoms are heteroatoms selected from N, O and S;

where the structural unit (IV) is selected from the structural units (IVa) and (IVb):

(IVa)

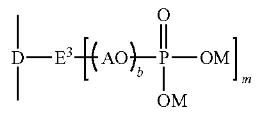

wherein

D is phenyl, naphthyl or heteroaryl having 5 to 10 ring atoms, of which 1 or 2 atoms are heteroatoms selected from N, O and S;

$E^3$ is N, NH or O, with the proviso that m is 2 if $E^3$ is N and m is 1 if $E^3$ is NH or O;

A is $C_2$-$C_5$ alkylene or $CH_2CH(C_6H_5)$, preferably $C_2$-$C_3$ alkylene;

b is an integer from 0 to 300;

M independently is H or a cation equivalent;

(IVb)

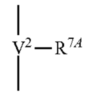

wherein $V^2$ is phenyl or naphthyl and is optionally substituted by 1 or two radicals selected from $R^8$, OH, $OR^8$, $(CO)R^8$, COOM, $COOR^8$, $SO_3R^8$ and $NO_2$;

$R^{7A}$ is COOM, $OCH_2COOM$, $SO_3M$ or $OPO_3M_2$;

M is H or a cation equivalent; and $R^8$ is $C_1$-$C_4$ alkyl, phenyl, naphthyl, phenyl-$C_1$-$C_4$ alkyl or $C_1$-$C_4$ alkylphenyl.

Polymers comprising structural units (III) and (IV) are obtainable by polycondensation of an aromatic or heteroaromatic compound having a polyoxyalkylene group attached to the aromatic or heteroaromatic core, an aromatic compound having a carboxylic, sulfonic or phosphate moiety, and an aldehyde compound such as formaldehyde.

In an embodiment, the dispersant is a non-ionic comb polymer having a carbon-containing backbone to which are attached pendant hydrolysable groups and polyether side chains, the hydrolysable groups upon hydrolysis releasing cement-anchoring groups. Conveniently, the structural unit comprising a polyether side chain is one of the general formulae (IIa), (IIb), (IIc) and/or (IId) discussed above. The structural unit having pendant hydrolysable groups is preferably derived from acrylic acid ester monomers, more preferably hydroxyalkyl acrylic monoesters and/or hydroxyalkyl diesters, most preferably hydroxypropyl acrylate and/or hydroxyethyl acrylate. The ester functionality will hydrolyze to (deprotonated) acid groups upon exposure to water at preferably alkaline pH, which is provided by mixing the cementitious binder with water, and the resulting acid functional groups will then form complexes with the cement component.

In one embodiment, the dispersant is selected from colloidally disperse preparations of polyvalent metal cations, such as $Al^{3+}$, $Fe^{3+}$ or $Fe^{2+}$, and a polymeric dispersant which comprises anionic and/or anionogenic groups and polyether side chains. The polyvalent metal cation is present in a superstoichiometric quantity, calculated as cation equivalents, based on the sum of the anionic and anionogenic groups of the polymeric dispersant. Such dispersants are described in further detail in WO 2014/013077 A1, which is incorporated by reference herein.

Suitable sulfonated melamine-formaldehyde condensates are of the kind frequently used as plasticizers for hydraulic binders (also referred to as MFS resins). Sulfonated melamine-formaldehyde condensates and their preparation are described in, for example, CA 2 172 004 A1, DE 44 11 797 A1, U.S. Pat. Nos. 4,430,469, 6,555,683 and CH 686 186 and also in Ullmann's Encyclopedia of Industrial Chemistry, 5th Ed., vol. A2, page 131, and Concrete Admixtures Handbook—Properties, Science and Technology, 2. Ed., pages 411, 412. Preferred sulfonated melamine-formaldehyde condensates encompass (greatly simplified and idealized) units of the formula

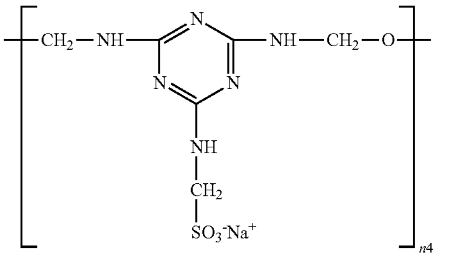

in which n4 stands generally for 10 to 300. The molecular weight is situated preferably in the range from 2500 to 80000 g/mol. Additionally, to the sulfonated melamine units it is possible for other monomers to be incorporated by condensation. Particularly suitable is urea. Moreover, further aromatic units as well may be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. An example of melaminesulfonate-formaldehyde condensates are the Melment® products distributed by Master Builders Solutions Deutschland GmbH.

Suitable lignosulfonates are products which are obtained as by-products in the paper industry. They are described in Ullmann's Encyclopedia of Industrial Chemistry, 5th Ed., vol. A8, pages 586, 587. They include units of the highly simplified and idealizing formula

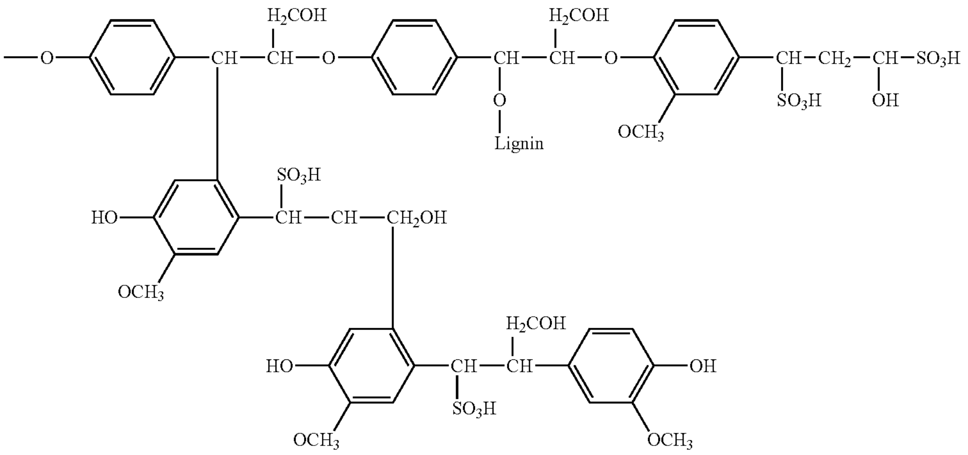

where m2 and n5 are generally each 10 to 250, $M^2$ is an alkali metal ion, such as $Na^+$, and the ratio m2:n5 is in general in the range from about 3:1 to about 1:3, more particularly about 1.2:1 to 1:1.2. Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. Examples of suitable sulfonated acetone-formaldehyde condensates are the Melcret K1L products distributed by Master Builders Solutions Deutschland GmbH.

Suitable sulfonated naphthalene-formaldehyde condensates are products obtained by sulfonation of naphthalene and subsequent polycondensation with formaldehyde. They are described in references including Concrete Admixtures Handbook—Properties, Science and Technology, 2. Ed., pages 411-413 and in Ullmann's Encyclopedia of Industrial Chemistry, 5th Ed., vol. A8, pages 587, 588. They comprise units of the formula

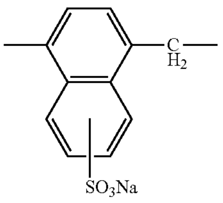

Lignosulfonates have molecular weights of between 2000 and 100 000 g/mol. In general, they are present in the form of their sodium, calcium and/or magnesium salts. Examples of suitable lignosulfonates are the Borresperse products distributed by Borregaard LignoTech, Norway.

Suitable sulfonated ketone-formaldehyde condensates are products incorporating a monoketone or diketone as ketone component, preferably acetone, butanone, pentanone, hexanone or cyclohexanone. Condensates of this kind are known and are described in WO 2009/103579, for example. Sulfonated acetone-formaldehyde condensates are preferred. They generally comprise units of the formula (according to J. Plank et al., J. Appl. Poly. Sci. 2009, 2018-2024):

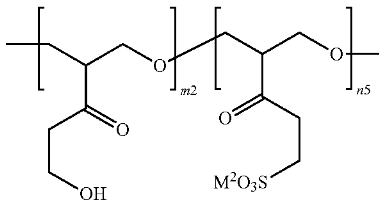

Typically, molecular weights (MW) of between 1000 and 50 000 g/mol are obtained. Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. Examples of suitable sulfonated β-naphthalene-formaldehyde condensates are the Melcret 500 L products distributed by Master Builders Solutions Deutschland GmbH.

Generally, phosphonate containing dispersants incorporate phosphonate groups and polyether side groups.

Suitable phosphonate containing dispersants are those according to the following formula $$R-(OA^2)_{n6}-N-[CH_2-PO(OM^3_2)_2]_2$$

wherein

R is H or a hydrocarbon residue, preferably a $C_1$-$C_{15}$ alkyl radical, $A^2$ is independently $C_2$-$C_{18}$ alkylene, preferably ethylene and/or propylene, most preferably ethylene, n6 is an integer from 5 to 500, preferably 10 to 200, most preferably 10 to 100, and $M^3$ is H, an alkali metal, ½ alkaline earth metal and/or an amine.

In an embodiment, the construction composition comprises, relative to the total amount of the construction composition, the cementitious binder in an amount of 7 to 15 vol.-%, preferably 12 to 14 vol.-%, sand in an amount of 25 to 30 vol.-%, preferably 28 to 30 vol.-%, and coarse aggregates in an amount of 40 to 50 vol.-%, preferably 40 to 45 vol.-%.

The construction composition may further comprise a supplementary cementitious material in an amount, relative to the weight of the cementitious binder, of 5 to 80 wt.-%, for example 15 to 70 wt.-%.

The freshly mixed construction composition comprises water in an amount, relative to the total amount of the construction composition, of 8 to 15 vol.-%, preferably 10 to 12 vol.-%.

Upon preparing a freshly mixed construction composition, air may be entrained in the construction composition. Preferably, the amount of air entrained is controlled depending on the properties as desired, i.e. to entrain more air when freeze-thaw resistance is needed, less when maximum compressive strength is required. The naphthalenesulfonic acid polycondensate, at useful dosages, does not result in unacceptably high air entrainment. The construction composition typically comprises air in an amount, relative to the total amount of the construction composition, of 1 to 6 vol.-%. More specifically, an air-entrained construction composition generally comprises 5 to 6 vol.-% of air; and a non-air-entrained construction composition generally comprises 1 to 2 vol.-% of air.

The invention further relates to a construction composition comprising a) a naphthalenesulfonic acid polycondensate obtainable by a condensation reaction of a-i) a naphthalenesulfonic acid, a-ii) an alkoxylated hydroxyaryl compound having a polyoxyalkylene chain with 3 to 130 oxyalkylene units, and a-iii) formaldehyde, in a weight ratio of i):ii) of 95:5 to 60:40, preferably 95:5 to 75:25, more preferably 95:5 to 85:15, b) at least one cementitious binder, c) a sand having a methylene blue value according to DIN EN 933-9 of at least 10 g/kg, and d) water.

EXAMPLES

The present invention is described in detail below with reference to the examples that follow.

Methods

Herein, the weight-average molecular weight values have been determined by gel permeation chromatography (GPC). As a stationary phase, a sequence of 3 columns PSS MCX, 5 μm, 1000 Å, ID 8.0 mm×300 mm (available from PSS), conditioned at 40° C., has been used. As a mobile phase, an eluent of 80 vol.-% of an aqueous solution of $Na_2HPO_4$ (0.07 mol/L) and 20 vol.-% of acetonitrile has been used. The injection volume was 100 μL at a flow rate of 1.0 mL/min. The molecular weight calibration was performed with polystyrene sulfonate standards for RI detector (standards available from PSS Polymer Standards Service).

Materials

Naphthalenesulfonic acid polycondensates i) according to examples 1 to 12 have been prepared, see tables 1 and 2. The following procedure describes the production of naphthalenesulfonic acid polycondensate i) of example 5. Examples 1 to 4 and 6 to 12 were carried out analogously.

In a small scale laboratory procedure, 194.2 g of β-naphthalene sulfonic acid (available from ABCR, about 10 wt.-% of moisture), 18.0 g of concentrated $H_2SO_4$ and 16.2 g of water were charged into an open reactor, heated to 110° C. to melt the mixture and stirred. At the desired internal temperature, 33.8 g of Pluriol® A 750 PH (available from BASF SE) were added to the mixture. For adding 27.1 g of formaldehyde to the resulting mixture, a 37% solution of formaldehyde was dropwise added thereto at 110° C. over a period of 1 h. After completion of the dropwise addition, the mixture was heated to reflux for 7 h. After 6 h, 20.0 g of water were added; after 7 h, another portion of 20.0 g of water was added. The reaction mixture was finally cooled to 80° C. and neutralized by addition of 251.0 g of aqueous NaOH (20%).

TABLE 1

Naphthalenesulfonic acid polycondensates with ethoxylated phenol.[1]

| # | amount of β-naphthalene sulfonic acid [2] [mol-%] | ethoxylated phenol: Pluriol ® . . . [3] | average number of oxyethylene units per molecule | MW of ethoxylated phenol [g/mol] | amount of ethoxylated phenol [2] [mol-%] |
|---|---|---|---|---|---|
| 1 | 97.5 | . . . A500PH | 10 | 500 | 2.5 |
| 2 | 95 | . . . A500PH | 10 | 500 | 5 |
| 3 | 90 | . . . A500PH | 10 | 500 | 10 |

TABLE 1-continued

Naphthalenesulfonic acid polycondensates with ethoxylated phenol.[1]

| # | amount of β-naphthalene sulfonic acid [2] [mol-%] | ethoxylated phenol: Pluriol ® . . . [3] | average number of oxyethylene units per molecule | MW of ethoxylated phenol [g/mol] | amount of ethoxylated phenol [2] [mol-%] |
|---|---|---|---|---|---|
| 4 | 97.5 | . . . A750PH | 15 | 750 | 2.5 |
| 5 | 95 | . . . A750PH | 15 | 750 | 5 |
| 6 | 90 | . . . A750PH | 15 | 750 | 10 |
| 7 | 97.5 | . . . A1500PH | 32 | 1500 | 2.5 |
| 8 | 95 | . . . A1500PH | 32 | 1500 | 5 |
| 9 | 97.5 | . . . A5010PH | 100 | 4500 | 2.5 |

[1]Formaldehyde iii) is added in a molar amount equal to the sum of the molar amounts of β-naphthalene sulfonic acid i) and the ethoxylated phenol compound ii).
[2] Amount relative to the total amount of β-naphthalene sulfonic acid and ethoxylated phenol.
[3] Available from BASF SE.

TABLE 2

Naphthalenesulfonic acid polycondensates with ethoxylated naphthol. [1]

| # | amount of β-naphthalene sulfonic acid [2] [mol-%] | ethoxylated naphthol: Lugalvan ® . . . [3] | average number of oxyethylene units per molecule | MW of ethoxylated naphthol [g/mol] | amount of ethoxylated naphthol [2] [mol-%] |
|---|---|---|---|---|---|
| 10 | 97.5 | . . . BNO12 | 12 | 650 | 2.5 |
| 11 | 95 | . . . BNO12 | 12 | 650 | 5 |
| 12 | 90 | . . . BNO12 | 12 | 650 | 10 |

[1] Formaldehyde iii) is added in a molar amount equal to the sum of the molar amounts of β-naphthalene sulfonic acid i) and ethoxylated naphthol ii).
[2] Amount relative to the total amount of β-naphthalene sulfonic acid and ethoxylated phenol.
[3] Available from BASF SE.

Construction compositions according to examples 13 to 18 of table 3 have been prepared with the following specifications:

13 vol.-% of Ordinary Portland Cement
plasticizer as shown in table 3
sand as shown in table 3
vol.-% of coarse aggregates
17 vol.-% of water (equaling a ratio of water to cementitious binder of 0.47)
1 vol.-% of air.

Two different grades of sand were examined. The first grade of sand was desert sand from a source in United Arab Emirates having a methylene blue value of 8 g/kg. This sand was spiked with 3.0 wt.-% of bentonite to obtain a comparative sand having a methylene blue value of 30 g/kg.

In order to allow for comparability, the dosage of the plasticizer was adjusted such that the slump of all mixes was about 12 cm after mixing. The method used for determining the slump is analogous to DIN EN 12350-2, with the modification that a mini-slump cone (height: 15 cm, bottom width: 10 cm, top width: 5 cm) was used instead of a conventional Abrams cone. 2 L of the aqueous construction composition were filled into the mini-slump cone. The cone was filled completely immediately after mixing. Afterwards, the cone was placed on a flat surface, and lifted, and the slump of the mix was measured.

The adjusted mortar mixes were each filled into mortar steel prisms (16/4/4 cm). After 3 h at a temperature of 23±2° C. and a relative humidity of 65%, a hardened mortar prism was obtained. The hardened mortar prism was demolded and compressive strength was measured according to DIN EN 196-1.

For preparing the construction composition, i.e. in freshly mixed form, cement, sand, and coarse aggregates have been mixed in a mixing pan of a Hobbart mixer. The Hobbart mixer was started, 90% of the mixing water was added and mixing was continued for 30 s. Afterwards, the plasticizer and the remaining 10% of the mixing water was added and mixing was continued for 4 min. Then, the mixer was stopped and the freshly mixed construction composition was obtained.

In order to evaluate the fluidity of the construction composition, the slump value of the construction composition was determined 5 and 30 min after mixing in accordance with the above method.

The naphthalenesulfonic acid polycondensates i) of table 1, number 5 was selected for further investigation and is referred to as "PEG-BNS" in the following.

TABLE 3

Construction compositions.

| # | plasticizer | dosage of plasticizer [% bwc] [1] | methylene blue value of sand [g/kg] | amount of sand [vol.-%] | slump 5 min [mm] | slump 30 min [mm] |
|---|---|---|---|---|---|---|
| 13* | PCE [2] | 1 | 30 | 29 | 150 | 80 |
| 14* | PCE [2] | 1 | 8 | 29 | 230 | 230 |
| 15* | BNS [3] | 1.4 | 30 | 29 | 200 | 100 |

TABLE 3-continued

Construction compositions.

| # | plasticizer | dosage of plasticizer [% bwc] [1] | methylene blue value of sand [g/kg] | amount of sand [vol.-%] | slump 5 min [mm] | slump 30 min [mm] |
|---|---|---|---|---|---|---|
| 16* | BNS [3] | 1.4 | 8 | 29 | 210 | 180 |
| 17 | PEG-BNS [4] | 1.4 | 30 | 29 | 220 | 200 |
| 18 | PEG-BNS [4] | 1.4 | 8 | 29 | 230 | 230 |

[1] bwc = based on cementitious binder

[2] 35 wt.-% of a polycarboxylate ether (having polyether side chains of about 2400 g/mol), with 3 wt.-% of gluconate, a defoamer, and a biocide.

[3] 42 wt.-% of BNS available from Tytan.

[4] Naphthalenesulfonic acid polycondensate of table 1, example 5, diluted to an active content of 42 wt.-%.

*comparative example.

The results from table 3 show that the naphthalenesulfonic acid polycondensate is less sensitive to variations in the quality of sand in comparison to standard plasticizers such as BNS or PCE. From a comparison of examples 14 and 13 and examples 16 and 15, respectively, it can be seen that the slump retention of conventional plasticizers BNS and PCE is deteriorated when using sand having high methylene blue value, i.e., high clay contents. Example 13 also shows that initial slump is low with PCE in a composition having high methylene blue value sand, which means that the initial dispersibility of PCE is deteriorated. On the other hand, the comparison of examples 18 and 17 shows that the naphthalenesulfonic acid polycondensate allows for high slump retention, irrespective of the clay content.

The invention claimed is:

1. A method of using a naphthalenesulfonic acid polycondensate for plasticizing a construction composition, the method comprising adding the naphthalenesulfonic acid polycondensate to the construction composition comprising sand and at least one cementitious binder, the naphthalenesulfonic acid polycondensate comprising a condensation reaction product of i) a naphthalenesulfonic acid, ii) an alkoxylated hydroxyaryl compound having a polyoxyalkylene chain with 3 to 130 oxyalkylene units, and iii) formaldehyde, in a weight ratio of i):ii) of 95:5 to 60:40, wherein the sand has a methylene blue value according to DIN EN 933-9 of at least 10 g/kg.

2. The method according to claim 1, wherein the sand has a methylene blue value according to DIN EN 933-9 of 10 to 50 g/kg.

3. The method according to claim 1, wherein the polyoxyalkylene units comprise at least 60 mol-% of oxyethylene units.

4. The method according to claim 1, wherein the hydroxyaryl compound is selected from phenols and naphthols.

5. The method according to claim 1, wherein the alkoxylated hydroxyaryl compound ii) is an ethoxylated phenol or an ethoxylated naphthol.

6. The method according to claim 1, wherein the cementitious binder comprises a cement selected from Portland cement, calcium aluminate cement and sulfoaluminate cement.

7. The method according to claim 6, wherein the cementitious binder additionally comprises a latent hydraulic binder.

8. The method according to claim 7, wherein the latent hydraulic binder is blast furnace slag.

9. The method according to claim 1, wherein the construction composition, in freshly mixed form, has a ratio of water to cementitious binder in the range of 0.3 to 0.6.

10. The method according to claim 1, wherein the construction composition additionally comprises at least one retarder and/or accelerator.

11. The method according to claim 1, wherein the construction composition additionally comprises at least one dispersant other than the naphthalenesulfonic acid polycondensate.

12. The method according to claim 1, wherein the construction composition comprises, relative to the total amount of the construction composition, the cementitious binder in an amount of 7 to 15 vol.-%, sand in an amount of 25 to 30 vol.-%, and coarse aggregates in an amount of 40 to 50 vol.-%.

13. The method according to claim 12, wherein the construction composition additionally comprises a supplementary cementitious material in an amount, relative to the weight of the cementitious binder, of 5 to 80 wt.-%.

14. The method of claim 1, wherein the weight ratio of i):ii) is 95:5 to 75:25.

15. The method of claim 1, wherein the weight ratio of i):ii) is 95:5 to 85:15.

16. The method according to claim 1, wherein the sand has a methylene blue value according to DIN EN 933-9 of 15 to 25 g/kg.

17. The method according to claim 1, wherein the sand has a methylene blue value according to DIN EN 933-9 of 20 to 30 g/kg.

18. The method according to claim 1, wherein the polyoxyalkylene units comprise at least 85 mol-% of oxyethylene units.

19. The method according to claim 1, wherein the polyoxyalkylene units comprise at least 95 mol-% of oxyethylene units.

20. The method according to claim 1, wherein the construction composition, in freshly mixed form, has a ratio of water to cementitious binder in the range of 0.35 to 0.4.

21. A construction composition comprising a) a naphthalenesulfonic acid polycondensate comprising a condensation reaction product of a-i) a naphthalenesulfonic acid, a-ii) an alkoxylated hydroxyaryl compound having a polyoxyalkylene chain with 3 to 130 oxyalkylene units, and a-iii) formaldehyde, in a weight ratio of i):ii) of 95:5 to 60:40, b) at least one cementitious binder, c) a sand having a methylene blue value according to DIN EN 933-9 of at least 10 g/kg, and d) water.

22. The construction composition of claim 21, additionally comprising coarse aggregates.

* * * * *